S. B. HAINES.
Harvester.
No. 72,999.
Patented Jan'y 7, 1868.
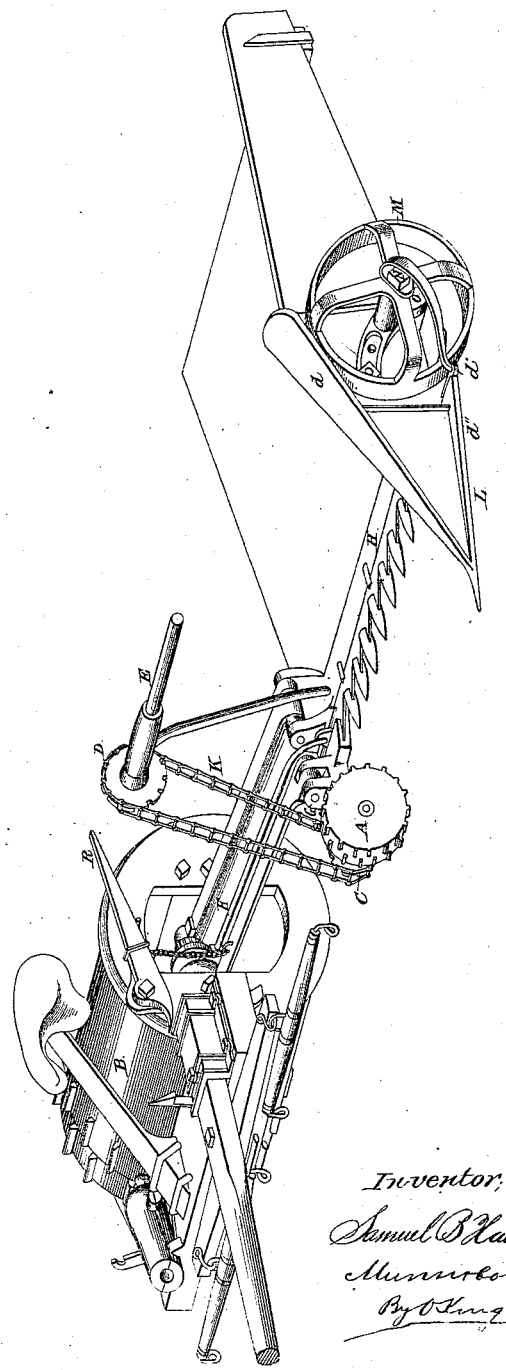
Witnesses;
Inventor;

UNITED STATES PATENT OFFICE.

SAMUEL B. HAINES, OF LEWISTOWN, PENNSYLVANIA.

IMPROVEMENT IN HARVESTERS.

Specification forming part of Letters Patent No. 72,999, dated January 7, 1868.

*To all whom it may concern:*

Be it known that I, SAMUEL B. HAINES, of Lewistown, in the county of Mifflin and State of Pennsylvania, have invented a new and useful Improvement in Harvesters; and I do hereby declare the following to be a full, clear, and exact description of the same, sufficient to enable one skilled in the art to which the invention appertains to make use of it, reference being had to the accompanying drawings, which form a part of this specification, and in which my invention is represented by a perspective view.

The lead-wheel, which supports the inner end of the cutter-bar and platform, is made the means of driving the reel or the rake, or both, a band, cord, or chain from a pulley or drum on the axis of the lead-wheel imparting the motion to the reel or rake, either or both.

The grain-wheel on the outer end of the platform, when moved up or down to adjust the height of the platform from the ground, moves in an arc the center of which is the point occupied by the rim of the wheel in the notch of the shoe, preserving the relation of the wheel to the latter at any adjustment.

The object is to distribute the sources of power, not to deduce all the power from the ground-wheels of the main frame, but to derive the power necessary to run the reel or rake, or both, when supported upon the outlying finger-beam or platform, from the lead-wheel, which supports the inner end of the finger-beam.

The lead-wheel is a necessity of the case to support the outlying finger-beam, and it is my design to utilize the traction of the lead-wheel on the ground to run the rake or reel, or both, and relieve to that extent the main driving-wheels. Every pound of power derived by the rake or reel from the ground-wheels of the frame is subtracted from the power of the knives, and the greater the draft upon the power of the ground-wheels, the heavier the frame and its appurtenances are required to be to give them sufficient strength and traction, and the greater is the consequent strain upon the team.

One great advantage of this mode of driving the rake or reel is the avoidance of their connection with the driving-power of the main carriage. Being supported upon the platform, and deriving their power from the lead-wheel, whose bearings are therein, all the undulatory motions of the platform incident to traveling over uneven ground do not disturb the relation of the rake and reel, nor necessitate special jointed connections with the driving-power of the main frame to run the said rake or reel.

In the drawings I have shown my improvements as applied to the harvester patented by me March 8, 1864, and as my invention, the subject of the present specification, has reference alone to improvements incident to the functions and arrangement of the lead-wheel and grain-wheel, I shall not describe specifically every part shown in the drawing, especially as they have no particular relation to this form of harvester, but are applicable to all forms where the cutting apparatus extends laterally from the main carriage of the machine, when a rake or reel is desirable.

In the illustration the gearing which vibrates the cutter-knives is inclosed within a drum, B, which is rotated by contact with the ground, the said motion of the drum being imparted by suitable means to the gearing inclosed, or capable of being detached therefrom when the action of the knives is no longer desired, as in moving from place to place.

A gear-frame, F, is pivoted to the main frame within the drum B, and projects outward through a large aperture in the head of the drum, carrying on its outer end a shoe, G, which is attached to the frame F by the customary horizontal joint, so as to permit the free vertical motion of either end of the finger-beam H. The lever R is intended to elevate the frame F when necessary.

To the shoe G is journaled the lead-wheel A, which is provided with teeth or projections to increase its traction on the ground. On the axis of the lead-wheel is attached a sprocket-wheel, C, which, by means of a chain, K, or its equivalent, rotates the wheel D on the shaft E, which may be furnished with arms to form a reel.

Instead of the chain K, connecting the sprocket-wheels C D, pulleys may be used with bands or cords, and, in the connection with the rake mechanism, will proceed from the pulley C on the lead-wheel shaft to form the required connection with the raking mechanism.

At the outer end of the platform are the divider L and the grain-wheel M. The latter is journaled upon an axis or bolt, N, which projects horizontally from the slotted curved bar O, which is bolted to a seat of corresponding shape on the side of the upright portion of the dividing-board L.

The wheel M is so arranged as to be nearly covered by the oblique board $d$, and its rim passes through a notch, $d'$, in the lower board, $d''$. By thus placing the wheel snugly under the protection of the divider the standing grain parted by the latter is not interfered with by the grain-wheel.

When it is desired to adjust vertically the outer end of the platform, the bolts which confine the bar O to its seat are loosened, and the required movement made, either upward or downward; and inasmuch as the center of the curve of the plate O and its seat is the point occupied by the rim of the wheel M in the notch $d'$ of the board $d''$, the adjustment of the rim of the wheel in the notch is not disturbed by the vertical adjustment referred to.

Having described my invention, what I claim therein as new, and desire to secure by Letters Patent, is—

1. The leading-wheel A, attached to the shoe G, as herein described and represented, and performing the double function of supporting the inner end of the finger-beam and operating either the rake or reel, or both, as and for the purpose set forth.

2. The grain-wheel M, in combination with the divider L, provided with flanges $d$ $d''$, the latter being notched at $d'$, and adjustable bearing O, all constructed and arranged substantially as described, so as to admit of the adjustment of the wheel M and secure the protection of the latter by the divider, as explained.

SAMUEL B. HAINES.

Witnesses:
  GEO. W. THOMAS,
  JAMES BURNS.